(12) United States Patent
Garg et al.

(10) Patent No.: US 11,595,495 B2
(45) Date of Patent: Feb. 28, 2023

(54) PROCESS ISOLATION VIA APPLICATION-LEVEL BLUE-GREEN TOPOLOGY

(71) Applicant: MORGAN STANLEY SERVICES GROUP INC., New York, NY (US)

(72) Inventors: Deepak Garg, Jersey City, NJ (US); Sujit Eapen, Plainsboro, NJ (US); Sonil Trivedi, Jersey City, NJ (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 6 days.

(21) Appl. No.: 17/390,337

(22) Filed: Jul. 30, 2021

(65) Prior Publication Data
US 2023/0031254 A1  Feb. 2, 2023

(51) Int. Cl.
| | |
|---|---|
| *H04L 67/60* | (2022.01) |
| *G06F 16/245* | (2019.01) |
| *H04L 41/0803* | (2022.01) |
| *H04L 9/40* | (2022.01) |
| *G06F 8/65* | (2018.01) |
| *G06F 8/71* | (2018.01) |
| *H04L 45/021* | (2022.01) |
| *G06F 9/50* | (2006.01) |
| *H04L 67/1004* | (2022.01) |

(52) U.S. Cl.
CPC ............ *H04L 67/60* (2022.05); *G06F 8/65* (2013.01); *G06F 8/71* (2013.01); *G06F 9/5077* (2013.01); *G06F 16/245* (2019.01); *H04L 41/0803* (2013.01); *H04L 45/021* (2013.01); *H04L 63/102* (2013.01); *H04L 67/1004* (2013.01)

(58) Field of Classification Search
CPC .. H04L 67/1004; H04L 45/021; G06F 9/5077
See application file for complete search history.

(56) References Cited

U.S. PATENT DOCUMENTS

| | | | |
|---|---|---|---|
| 6,947,992 B1 | 9/2005 | Shachor | |
| 9,037,747 B1 * | 5/2015 | Vendrow | H04L 45/021 709/238 |

(Continued)

FOREIGN PATENT DOCUMENTS

WO  20211 13106 A1  6/2021

*Primary Examiner* — Barbara B Anyan
(74) *Attorney, Agent, or Firm* — Weitzman Law Offices, LLC

(57) ABSTRACT

A method for routing requests to a plurality of server clusters is disclosed. The method comprises establishing a first server cluster responding to requests concerning a first software via a first version of that software and to requests concerning a second software via a first version of that software, and a second server cluster responding to requests concerning the first software via a second version of that software and to requests concerning the second software via a second version of that software. A gateway router initially routes requests concerning the first and second software by default to the first server cluster. Upon receiving a request to change default routing of requests, a configuration of the gateway router is updated. Subsequent requests concerning the first software are routed to the second server cluster while subsequent request concerning the second software remain routed to the first server cluster.

20 Claims, 6 Drawing Sheets

(56) References Cited

U.S. PATENT DOCUMENTS

| | | |
|---|---|---|
| 10,732,962 B1 | 8/2020 | Florescu |
| 2013/0282746 A1 | 10/2013 | Balko et al. |
| 2016/0173583 A1 | 6/2016 | Rajan et al. |
| 2018/0011874 A1 | 1/2018 | Lacapra et al. |
| 2019/0065275 A1 | 2/2019 | Wong et al. |
| 2019/0155597 A1 | 5/2019 | Lander et al. |
| 2020/0019471 A1 | 1/2020 | Natanzon et al. |
| 2020/0026508 A1 | 1/2020 | Eapen et al. |
| 2021/0083922 A1 | 3/2021 | Althaus et al. |
| 2021/0103441 A1 | 4/2021 | Jain |
| 2021/0176304 A1* | 6/2021 | Muthiah ............. H04L 67/1004 |
| 2021/0406088 A1* | 12/2021 | Chen .................... G06F 9/5077 |

* cited by examiner

PROCESS ISOLATION VIA APPLICATION-LEVEL BLUE-GREEN TOPOLOGY

FIELD OF INVENTION

This disclosure relates to systems and methods for improved networking and server cluster topologies, and more specifically, to systems and methods for providing finer control over software versioning, upgrades, and error response without system downtime through use of a blue-green system topology on the server side of a server-client system.

BACKGROUND

In a server architecture supporting software-as-a-service or cloud-based computing, a "blue-green" topology is often used to allow simultaneously providing a stable production system (the "blue" system) and an unstable system undergoing development (the "green system"). Both systems run in parallel with a router or load balancer directing incoming requests from consumers or other non-developers to the "blue" system, and directing requests from developers, quality assurance representatives, software testers, or other authorized individuals to the "green" system.

When the new version of the software on the "green" system is deemed ready to go into production, any databases on the "blue" system may be cloned or otherwise migrated to the "green" system, and the router begins to direct traffic by default to the formerly "green" system, which is then denoted the new "blue" system. Because the change instantly occurs due to a changed configuration at the router, there is no downtime when the switch occurs. If bugs are detected after the switch occurs, the router's former configuration may be restored, to again seamlessly transition back to the former "blue" system while the "green" system undergoes further development and testing.

In many fields, business process management (BPM) software is used to track a number of parameters related to a workflow representing a task or project as it goes through stages or iterations towards completion. For example, BPM software may be used to track the confirmation of a bug report and fixing of the bug in software development, to track the status of an automobile at a mechanic through various procedures or checkups, to track the completion of a service request made to a customer service department, etc.

When a blue-green cluster system is used for multiple separate applications or workflows, there may be complications relating to a server-level switchover. While the software related to one workflow may be ready to go into production, the software related to another workflow may not, in which case the switchover is delayed until every piece of software is ready. If an error is discovered in the new "blue" server software after a switchover, there may be issues with merely rerouting back to the "green" (formerly "blue") server if some software on the "green" server has been modified in the meantime and other software has not. Thus, there are advantages to having a system that allows finer control over how specific requests to access server-side software are handled in a blue-green setup.

SUMMARY OF THE INVENTION

A system for routing requests to a plurality of server clusters is disclosed. The system comprises a first server cluster, a second server cluster, a gateway router, and non-transitory memory. The first server cluster comprises at least one server responding to requests concerning a first software via a first version of the first software and to requests concerning a second software via a first version of the second software. The second server cluster comprises at least one server responding to requests concerning the first software via a second version of the first software and to requests concerning the second software via a second version of the second software. The gateway router initially routes requests concerning the first software by default to the first server cluster, unless an originator of a request has first predetermined credentials, in which case that request is routed to the second server cluster, and initially routes requests concerning the second software by default to the first server cluster, unless an originator of a request has second predetermined credentials, in which case that request is routed to the second server cluster. The non-transitory memory comprises instructions that, when executed by one or more processors, cause the one or more processors to receive a request to change default routing of requests concerning the first software to the second server cluster and update a configuration of the gateway router. In response to a subsequent request concerning the first software, the gateway router routes the request to the second server cluster unless an originator of a request has the first predetermined credentials; and in response to a subsequent request concerning the second software, the gateway router routes the request to the first server cluster unless an originator of a request has the second predetermined credentials.

Similarly, a computer-implemented method for routing requests to a plurality of server clusters is disclosed. The method comprises establishing a first server cluster comprising at least one server responding to requests concerning a first software via a first version of the first software and to requests concerning a second software via a first version of the second software and establishing a second server cluster comprising at least one server responding to requests concerning the first software via a second version of the first software and to requests concerning the second software via a second version of the second software. Further, a gateway router is programmed to initially route requests concerning the first software by default to the first server cluster, unless an originator of a request has first predetermined credentials, in which case that request is routed to the second server cluster, and that initially routes requests concerning the second software by default to the first server cluster, unless an originator of a request has second predetermined credentials, in which case that request is routed to the second server cluster. In response to receiving a request to change default routing of requests concerning the first software to the second server cluster, a configuration of the gateway router is updated. In response to a subsequent request concerning the first software, the request is routed to the second server cluster unless an originator of a request has the first predetermined credentials; and in response to a subsequent request concerning the second software, the request is routed to the first server cluster unless an originator of a request has the second predetermined credentials.

Additional features include variations of the above system and method wherein additional server clusters are used, wherein multiple cells are used for different software, each cell handling requests related to different software, wherein the re-routing is done to balance server load, to avoid affecting high priority systems, to publish production-ready software, or to unpublish production software exhibiting an error. Configurations of the gateway router may be handled via push request from a server configuration subsystem or pull request to a failover database.

BRIEF DESCRIPTION OF THE DRAWINGS

Other aspects, features and advantages will become more fully apparent from the following detailed description, the appended claims, and the accompanying drawings (provided solely for purposes of illustration without restricting the scope of any embodiment), of which:

DETAILED DESCRIPTION

Figure 1:
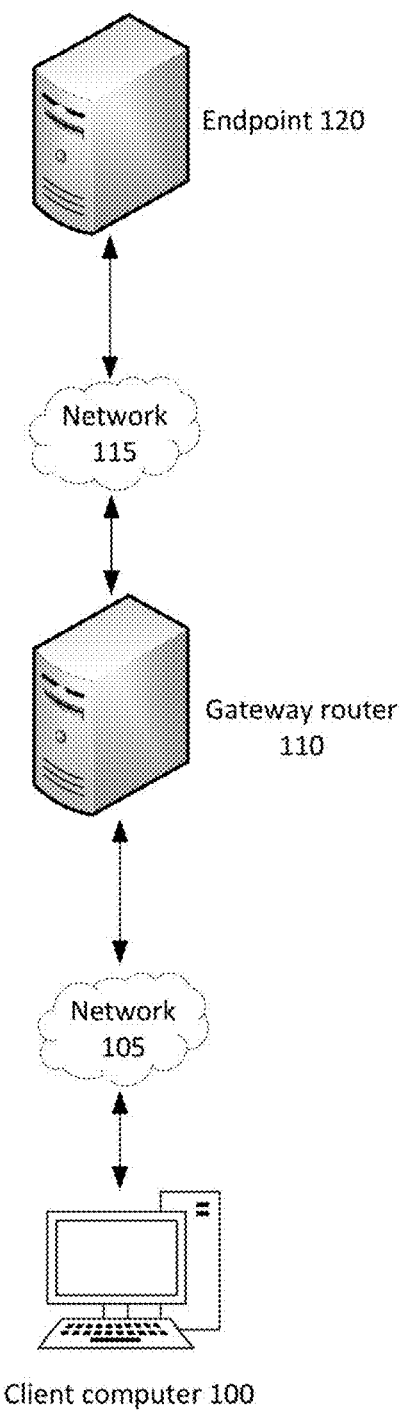
FIG. 1 illustrates, in simplified form, a system of computing devices used in a blue-green topology (or other n-colored topology for an n greater than 2) from the point of view of a client computing device of the system.

In order to address the lack of adequate methods for handling the situation where two server clusters may both have some software that is not production-ready may be addressed by creating a system in which neither cluster is entirely "green" nor entirely "blue". Instead, the system tracks the status of a variety of software versions or functionalities that are each "green" and "blue" on one server cluster and the other, respectively, but such that neither cluster need be completely "green" or blue, and need only be designated "green" or "blue" with respect to a particular software version or functionality. As a result, when one piece of software is ready to be published, it may be changed from "green" to "blue" on its current cluster, regardless of the "green" or "blue" status of all the other software, and when one piece of software demonstrates a production error or requires maintenance, it may be changed from "blue" to "green" on its current cluster, regardless of the "green" or "blue" status of all the other software. Software upgrades need not be delayed until all software on a cluster is ready, and software unpublishing need not affect any other software on the same cluster: in each instance, the blue/green designation of the particular software is changed without changing the designation of any other software present on the same clusters.

Moreover, once the server clusters are separated from the designation, more complex designations than merely "blue" and "green" are possible. For example, a company might choose to have a "green" version that is completely unstable and routinely modified by developers; a "yellow" version that is intended to be stable but is used exclusively by testers and quality assurance representatives: a "purple" version that is in production, but is only accessible internally; and a "blue" version that is in production and accessible externally. Thus, at each stage from "green" to yellow to purple to blue, the intended stability increases and the tolerance for error decreases. Users of the yellow system may require only that it be stable enough to test particular functionality even if it is non-functional as a whole; users of the purple system may require functionality, but an error in a user interface or an error that exposes confidential data will not cost the company goodwill since it is internally accessible only; and users of the "blue" system may require perfect functionality and protection of confidential data. If each of four clusters of servers were to be designated as exclusively green, yellow, purple, and blue, migration and re-designation of each of the four clusters to another color could be an unnecessarily complex process that risks complications, downtime, and production errors. If, instead, only the four versions of one particular element of software are "re-colored" while the other systems are completely unaffected, the possibility of complications, downtime, and production errors is drastically decreased. Naturally, different nomenclature or organization may be used based on an organization's needs, rather than only using color designations, or only using colors to denote the same classifications described herein.

FIG. 1 illustrates, in simplified form, a system of computing devices used in a blue-green topology (or other n-colored topology for an n greater than 2) from the point of view of a client computing device of the system.

With reference now to FIG. 1, a user interface on a client computer 100 may be used by a human user to generate a request that will be transmitted to an ultimate endpoint 120 and be acted upon by a server at the endpoint 120. In a preferred embodiment, the request is related to an API for initiating or updating a workflow created using business project management (BPM) software, though in other embodiments, any kind of software API may be facilitated by the present disclosure, or even a system that would not normally be considered an API, such as a webpage with interactive functionality. The client software used to originate the API request may be, in various embodiments, a mobile device app, a native desktop app, an applet or servlet embedded in a web page, a plugin in an email client or other messaging software, or some other form of software with a user interface.

In some embodiments, client computer 100 may connect to a gateway router 110 directly, or via a company ethernet or wireless network 105. In other embodiments, the network 105 between client computer 100 and gateway router 110 may involve some number of intermediate routers, such as the connection between a client computer in one office using a virtual private network to access devices in another office, or a client computer using the Internet generally to access a particular gateway router 110.

From the point of view of the user and of the user's computer on the network, the topology of the network 115 behind the router 110 is unknown and can be changed at any time without the user interface being affected. So long as a structured interface-including, by way of example only, an API based on the Simple Object Access Protocol (SOAP) or Representational State Transfer (REST) with a JavaScript Object Notation (JSON) object transmitted via HTTP—has been established for communication with the underlying server software running on some server 210 (see FIG. 2), the gateway router 110 may have any server architecture behind it and the client computer can be completely agnostic to, for example, which server 210 it is ultimately being served by or what version of particular software is running on that server.

Figure 2:
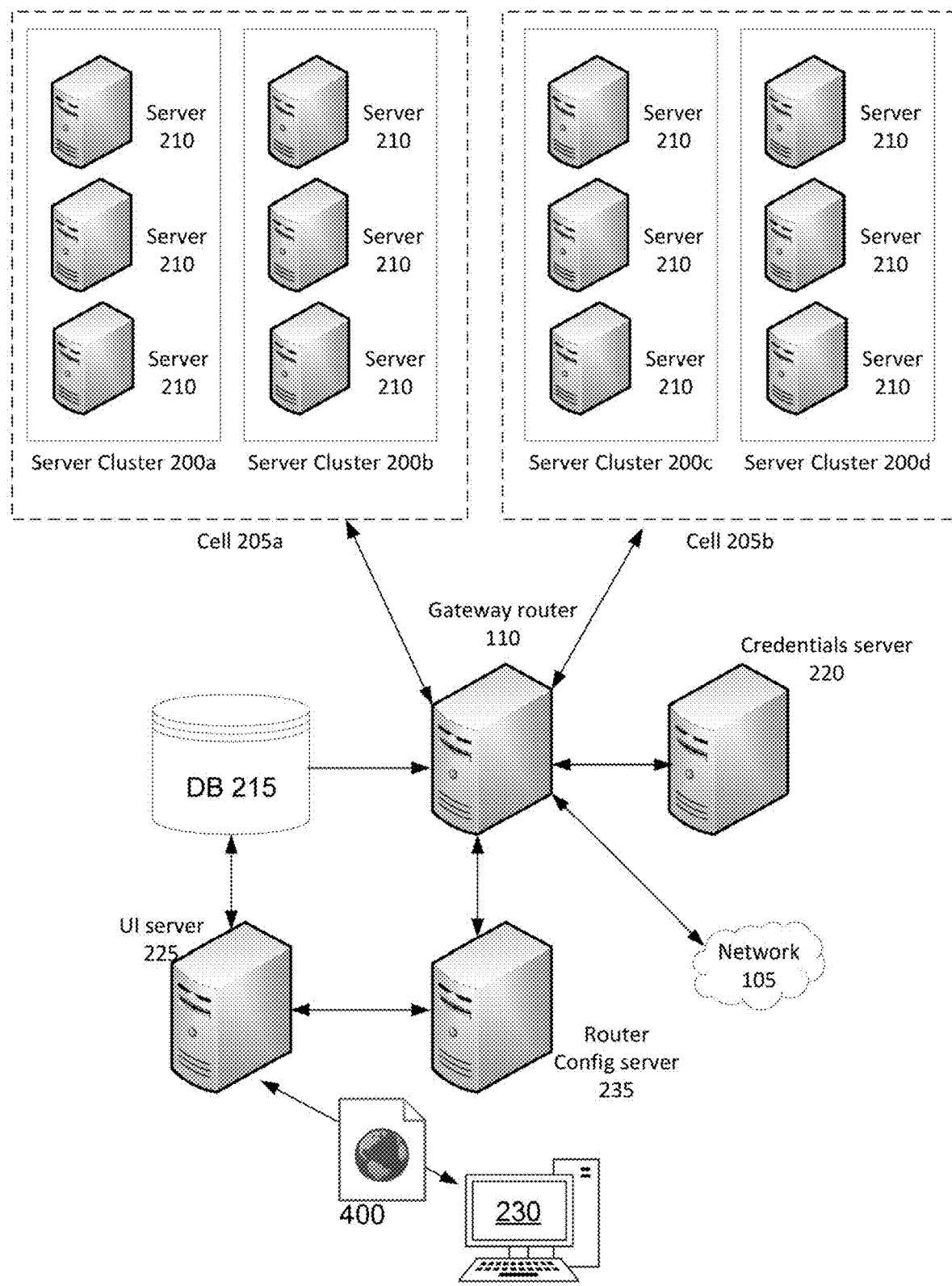
FIG. 2 illustrates, in simplified form, the backend of the client-server system of FIG. 1.

FIG. 2 illustrates, in simplified form, the backend of the client-server system of FIG. 1 (revealing what is shown as simply the unknown network 115 in FIG. 1).

The gateway router 110 is connected directly or indirectly to a plurality of server clusters 200, each server cluster comprising one or more software servers 210 (or at least software modules for providing server services, if some form of virtualization or processor sharing is used). Each software server 210 in a given cluster 200 may be running a same version of server software for BPM or for other software services, and each cluster 200 may have servers 210 running a different version of the BPM server software or other software services from each of the other clusters' servers. In an exemplary embodiment, the overarching server software may be Process Federation Server™, produced by the International Business Machines Corporation, and each cluster may run different versions of software configured to run with the overarching server software. For example, if there is a workflow related to the creation of new accounts for individuals with an organization, a first cluster 200a may have a number of servers 210 that each run "version 1.0" of the software in a published and stable mode (i.e., the "blue" cluster for that workflow type), while a second cluster 200b may have a number of servers 210 that each run an experimental "version 1.1" of the same software that is still under development and not ready for production (i.e., the "green" cluster for that workflow type).

The gateway router 110 is also connected to a database 215. The database may store a plurality of records associating workflows or software types with the server clusters 200 that are given the "blue," "green," or other designations for those workflows or software types. By querying the database 215 to obtain the records representing clusters' designations and software services, the gateway router 110 determines which clusters are running appropriate software to handle the request, and therefore which server clusters 200 are options for the destination of the request. Although a preferred embodiment of the database 215 might use, for example, a structured query language (SQL) based database, any data structure for associating data may be used, such as NOSQL systems, comma-separated value files, or other data types suitable for storing information and quickly accessing it based on a query that specifies the workflow or other software type of the request received. In a preferred embodiment, the database 215 acts only as a "failover" database, and a router configuration server 235 is consulted instead, and the database 215 consulted only when the router configuration server 235 cannot be contacted.

In order to determine whether to route the request to the "blue" server cluster or the "green" server cluster for a given workflow or other software type, the gateway router 110 may also be connected to a credentials server 220, so that a request can be routed based at least in pan on the identity of the requestor. For example, the default behavior in a typical blue-green system is to route most requests to the "blue" system, but authorized developers or testers may be routed to the "green" system instead. In other embodiments, heightened permissions may be necessary to access the "blue" system at all, with even rarer or higher permissions needed to access the "green" system, and with all attempted requests lacking such credentials being denied routing by the gateway router 110.

In some embodiments, the credentials server 220 may be, for example, a server for the Kerberos security protocol. In other embodiments, the server may facilitate a form of single-sign-on security system such that the same credentials used to access the user interface on the client computer 100 are incorporated into a client request received at the gateway router 110.

In some embodiments, multiple clusters 200 may be grouped into a number of "cells" 205, such that each cell is solely responsible for certain forms of software or workflows. Incoming requests to engage with an API or otherwise transmit information may first be sorted at the gateway router to determine the appropriate cell 205 that handles that form of software or workflow. After the proper cell 205 is determined, the identity of the requestor is used to determine which cluster 200 within that cell is currently hosting the version of the software to which the requestor should be routed, whether "blue" or "green."

In order to control server assignments for software versions, a UI provision server 225 provides, in a preferred embodiment, a web-based UI 400 (depicted in FIG. 4) for system administrators having authority over "blue" and "green" designations to view the current designations and change those designations for each workflow or other kind of software. A system administrator may use an administrator computing device 230 with a web browser or other software to access the UI 400 and update the blue-green topology, according to a method depicted in FIG. 5 and discussed further in relation to that figure.

The UI provision server 225 may maintain communication with a router configuration server 235 that can push updates to the gateway router 110, or the database 215 or another database with which the gateway router 110 communicates, and thereby control the configuration of the gateway router 110. In a preferred embodiment, the router configuration server 235 uses Apache ZooKeeper™ to convert information received from the UI provision server 225 to a form useable by the gateway router 110. In other embodiments, any other kind of software capable of generating a message that is directly or indirectly received by the gateway router 110 and thereafter modifies the behavior of the gateway router 110 may be used instead.

The server clusters 200 may have connections to one or more external computing systems via the networks 105 or other networks, for various purposes such as notifying third party systems that a task has been initiated, modified, or completed; pulling data from a third-party database; or using a parallel communications method to communicate with the requestor, such as generation of a confirmation email or two-factor authentication.

Although a particular division of functions between devices is described with relation to the systems depicted in FIGS. 1 and 2, above, other configurations are possible in which functions are divided among devices differently. For example, all of the functions of some or all of the client computing device 100, the database 215, the credentials server 220, the UI provision server 225, the administrator computing device 230, and the server configuration server 235 may be performed by a single device with multiple threads executing different software modules simultaneously.

Alternatively, each system or device from among client computing device 100, the database 215, the credentials server 220, the UI provision server 225, the administrator computing device 230, and the server configuration server 235 may in fact be a cluster of computing devices sharing functionality for concurrent processing. Further, although these various computing elements are described as if they are one computing device or cluster each, a cloud-based solution with multiple access points to similar systems that synchronize their data and are all available as backups to one another may be preferable in some embodiments to a unique set of computing devices all stored at one location. The specific number of computing devices and whether communication between them is network transmission between separate computing devices or accessing a local memory of a single computing device is not so important as the functionality that each part has in the overall scheme. What does remain of importance is that there are at least two server clusters 200, each with at least one server, and that both server clusters 200 provide access to multiple applications or workflows, such that the blue-green designations of the clusters with respect to the multiple applications are independent of one another.

Further, the specific arrangement of devices within the topology is not vital, so long as the gateway router 110 acts as an intermediary between the client computing device 100 and the server clusters 200. The database 215, the credentials server 220, the UI provision server 225, the administrator computing device 230, and the server configuration server 235 need not be on the same "side" of the gateway router 110 as depicted in FIG. 2. They each may be instead on the opposite side, able to communicate with the client computing device 100 without using the gateway router 110.

Figure 3:
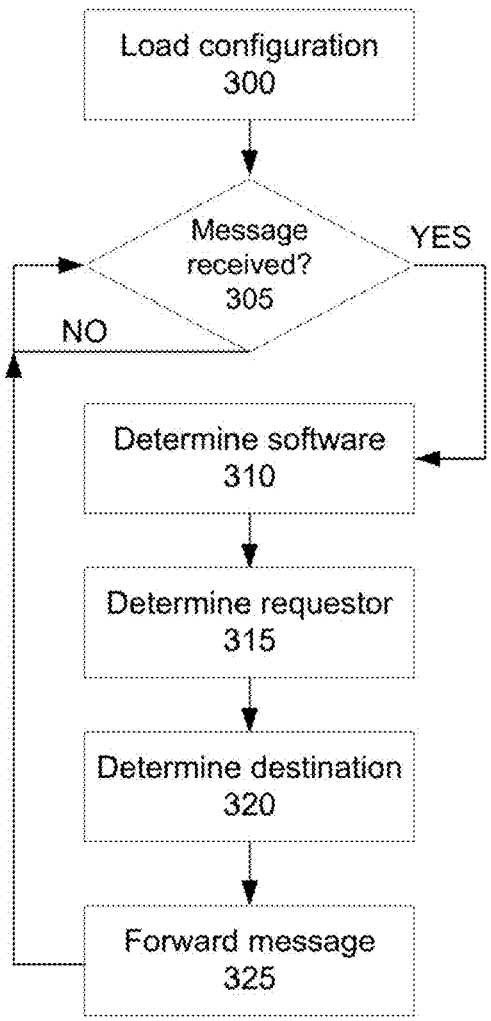
FIG. 3 illustrates, in simplified form, a flowchart of a method for directing incoming traffic to a blue-green server system.

FIG. 3 illustrates, in simplified form, a flowchart of a method for directing incoming traffic to a blue-green server system.

First, when the gateway router 110 is turned on and begins routing messages, it loads a configuration into memory (Step 300). This configuration may be retrieved from the router configuration server 235, the database 215, or may be stored in local persistent storage or otherwise available to the gateway router. In a preferred embodiment, only the router configuration server 235 is consulted, and the database 215 acts as a "failover" to be consulted only if the router configuration server 235 is unavailable.

After the configuration has been loaded, the gateway router 110 enters a default mode of waiting for an incoming message in need of being routed (Step 305).

When a message is received, the gateway router 110 initially determines what type of software or workflow the message is related to (Step 310). The determination may be based on metadata associated with headers of packets of the request, on textual analysis of the contents of packets of the request, on a destination or origin of the packets, or on any other means that might be used within a computing system to distinguish one type of communication from another.

Next, the gateway router 110 may need to determine the identity of the requestor who caused the message to be generated (Step 315). As previously discussed, many systems route traffic by default to the "blue" system, but route developers or testers to the "green" system instead. Identification of the requestor may be based on the origin address of packets, on credentials transmitted with the request (such as a security token or cookie), or on textual analysis of the message contents (accepting the word of the requestor that the requestor falls into a special class of user or routing).

Once the relevant information is known, the gateway router 110 will determine the cell 205 (if applicable) and cluster 200 for forwarding the message (Step 320). If a multi-cell organizational scheme is used, the previously-loaded configuration information should include a lookup table, database, or other means of quickly identifying a unique cell 205 for the given software or workflow. Then, whether a cell has been identified or not, the previously-loaded configuration information should also include a lookup table, database, or other means of quickly identifying which server cluster 200 is the "blue" or default cluster, and which server clusters 200 are "green" or have other designations for which a requirement related to requestor identity must be met in order to have access. By consulting the configuration and having determined the class, role, or identity of the requestor, a particular server cluster 200 is identified as the proper destination for the request.

After making the determination, the gateway router 110 forwards the message to the proper cell 205 and cluster 200 for action and response by that cluster 200 (Step 325). Once the message is routed, the gateway router returns to waiting for another incoming message, or processing any additional messages that were received and queued while waiting for resolution of the first message (back to Step 305).

Figure 4:
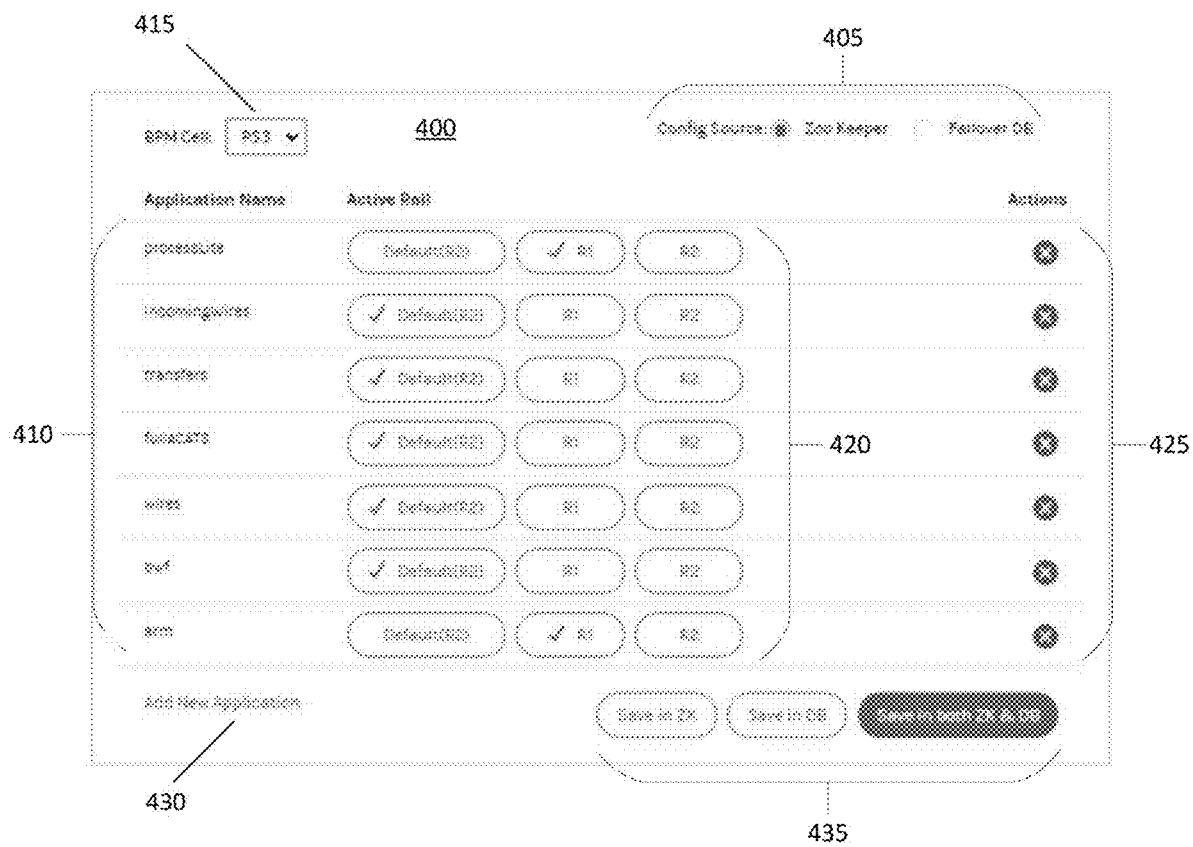
FIG. 4 illustrates, in simplified form, a possible graphical user interface (GUI) for manipulating the blue/green designations of a variety of software services.

FIG. 4 illustrates, in simplified form, a possible graphical user interface (GUI) for manipulating the "blue"/"green" designations of a variety of software services.

In a preferred embodiment, as mentioned above, a UI 400 may be provided from the UI provision server 225 in the form of a webpage visited using a web browser on the administrator computing device 230.

The UI is initially populated based on the selection in the source selection element 405. Although it is generally desired that the database 215 and the router configuration server 235 store identical information, it is possible through either error or deliberate choice that the configurations stored in each subsystem may differ. Selection of a different configuration source using the source selection element 405 may help an administrator to identify when there is a data inconsistency between the sources. Selection also allows the administrator to decide which of two differing versions will be used to overwrite the other when the configuration is saved, if consistency is desired.

The UI includes an application list 410 that includes each of the various forms of software or workflows that may be routed to either a "blue" or "green" server cluster 200.

The UI 400 may include a cell selection dropdown 415 or other user interface element for selecting one of multiple cells 205 in the system, if the system is organized in that manner. Selection of a cell will update the application list 405 to include only the software or workflows that are handled by that cell.

Associated with each application listed in the application list 410 is a rail selection 420 that lists the separate clusters 200 that may be chosen to be designated the "blue" cluster for the given application. A check mark or other visible user interface feature may be used to indicate the current "blue" designation, and clicking, tapping, or otherwise interacting with the rail selection 420 will change the "blue" designation to the option selected.

Additional user interface elements may be provided to allow deletion 425 of software or workflows from the configuration, or to add 430 new software or workflows and set the configuration of the new addition.

When the administrator has made changes to the rail selections 420, one of several save options 435 may be selected by clicking, tapping, or other interaction. Although the preferred behavior is to save a configuration to both the database 215 and the router configuration server 235, the administrator has the option of saving the presently displayed configuration to only one of those two sources and leaving the other unchanged.

Further, the save options 435 may be used even when the administrator has not changed any rail selections 420. For example, if there is a discrepancy between the configuration sources, the discrepancy can be resolved by selecting one source and saving to the other source or to both sources.

In some embodiments, additional information may be displayed in the UI 400. For example, each application could have an indication of criticality, priority, or importance to the organization using the application. As a result, the administrator may be warned that changes to a first application on a server cluster also handling a second, critical application may risk that an unintended error in the first application may jeopardize access to the second, critical application. Similarly, if a first application is already on a server cluster handling a second, critical application and the first application begins to exhibit errors, the UI may display an indication showing the gravity of the errors. As a result, the administrator may be better able to make a judgment whether it is preferable to shift traffic away from the server cluster so a grave error will not affect a critical application, or preferable to tolerate a minor error in a non-critical application and not change any configuration information regarding the server cluster that might ultimately affect the critical application.

For another example, each application could have information displayed related to its readiness to go into production or its continued suitability for production. As development and testing continue, the information may be updated until an administrator concludes it is time to direct traffic from a former "blue" system to a new, formerly "green" system with a new software version. Conversely, if significant errors are detected related to an application already in production, a version rollback can be executed by the administrator directing traffic from the current "blue" system to a "green" system that had been the "blue" system for the previous software version.

For another example, the current loads, average loads, or other server capacity information may be displayed for each of the server clusters 200, so that an administrator is able to take load balancing into account when deciding which server cluster should act as the externally available "blue" system, and so that a single server cluster is not designated as "blue" for every application and overloaded compared to another server cluster.

Figure 5:
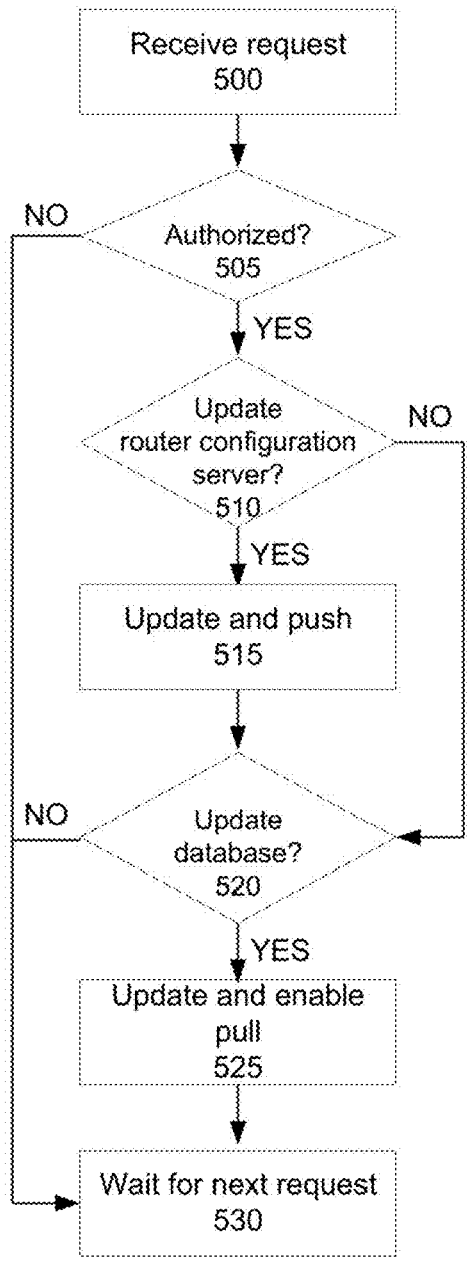
FIG. 5 illustrates, in simplified form, a flowchart of a method for updating "blue," "green," or other designations in accordance with commands issued via the GUI of FIG. 4.

FIG. 5 illustrates, in simplified form, a flowchart of a method for updating "blue," "green," or other designations in accordance with commands issued via the GUI of FIG. 4.

When the system receives a request to update router configuration information (Step 500), the system first determines whether the individual requesting the change has authorization to do so (Step 505). This process may involve examining a security token provided with the request, contacting the credentials server 220, or any other means of determining that there are a set of authorized administrators and that the person using the UI 400 to update the configuration is authorized to do so.

In accordance with the save options 435 of the UI 400, the incoming request may indicate that the router configuration server 235 should be updated, that the database 215 should be updated, or that both should be updated.

If the request indicates that the router configuration server 235 should be updated (Step 510), then a message is transmitted to the router configuration server 235 (Step 515). Because the router configuration server 235 is an active computing device capable of transmitting messages of its own over the network, the router configuration server 235 is able to generate a "push" notification and immediately update the functioning of the gateway router 110 in accordance with the request.

Next, whether or not the router configuration server was updated, the system checks whether an update of the database 215 was requested (Step 520).

If a database update was requested, the relevant records of database 215 are updated (Step 525). Because the database 215 is passive and waits for incoming queries, there is no "push" notification and no immediate change to the behavior of the gateway router 110. Instead, the database 215 is ready to reply if a "pull" notification is requested by the gateway router 110.

Once the router configuration server 235 and/or the database 215 have been updated, the system waits for further input from the UI provision server 225 (Step 525, ultimately returning to Step 500 if further input is provided).

Although FIGS. 1 and 2 depict a preferred configuration of computing devices and software modules to accomplish the software-implemented methods described above, those methods do not inherently rely on the use of any particular specialized computing devices, as opposed to standard desktop computers and/or web servers. For the purpose of illustrating possible such computing devices, FIG. 6, below, describes various enabling devices and technologies related to the physical components and architectures described above.

Figure 6:
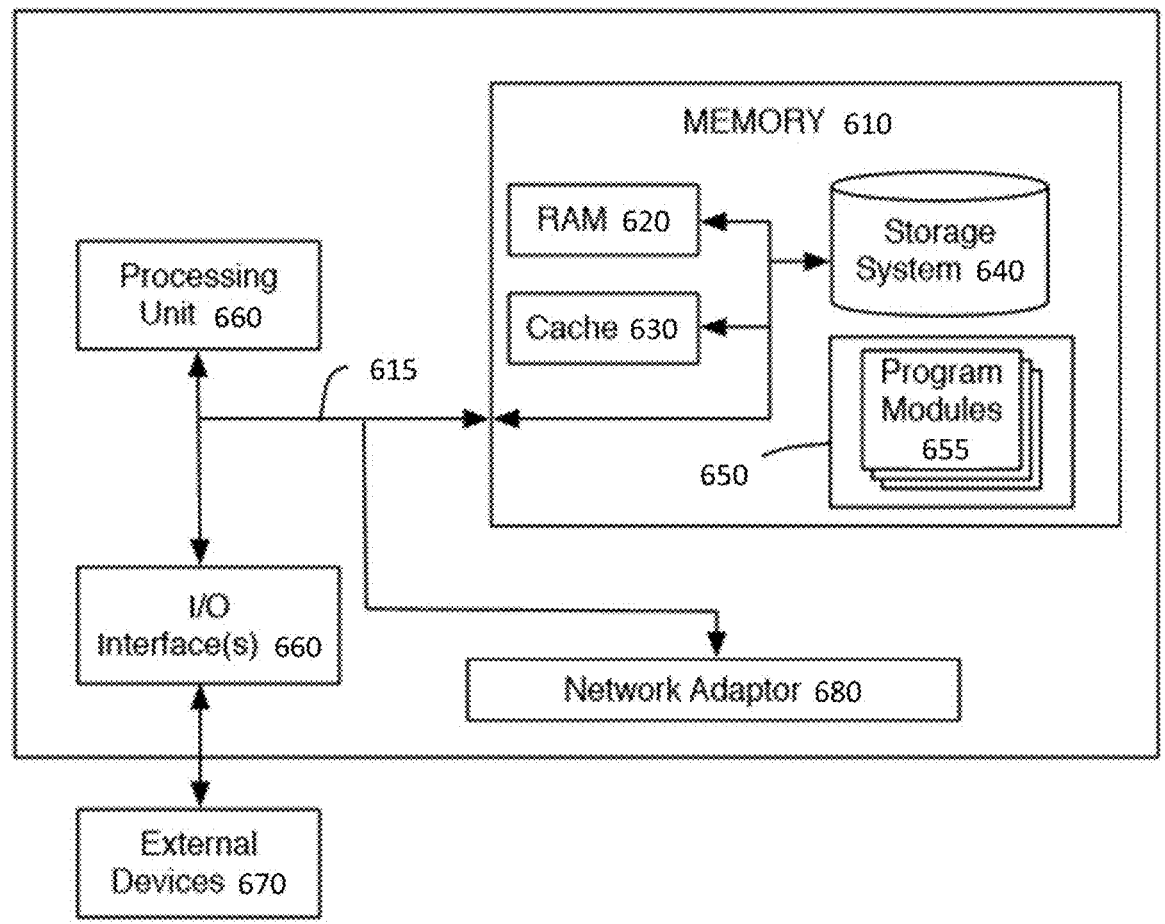
FIG. 6 is a high-level block diagram of a representative computing device that may be utilized to implement various features and processes described herein.

FIG. 6 is a high-level block diagram of a representative computing device that may be utilized to implement various features and processes described herein, for example, the functionality of the client computing device 100, the gateway router 110, the database 215, the servers 210, the credentials server 220, the UI provision server 225, the administrator computing device 230, the router configuration server 235, or any other computing device described. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 6, the computing device is illustrated in the form of a special purpose computer system. The components of the computing device may include (but are not limited to) one or more processors or processing units 600, a system memory 610, and a bus 615 that couples various system components including memory 610 to processor 600.

Bus 615 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 600 may execute computer programs stored in memory 610. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 600 may be used.

The computing device typically includes a variety of computer system readable media. Such media may be any available media that is accessible by the computing device, and it includes both volatile and non-volatile media, removable and non-removable media.

System memory 610 can include computer system readable media in the form of volatile memory, such as random access memory (RAM) 620 and/or cache memory 630. The computing device may further include other removable/non-removable, volatile/non-volatile computer system storage media. By way of example only, storage system 640 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 615 by one or more data media interfaces. As will be further depicted and described below, memory 610 may include at least one program product having a set (e.g., at least one) of program modules that are configured to carry out the functions of embodiments described in this disclosure.

Program/utility 650, having a set (at least one) of program modules 655, may be stored in memory 610 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 670 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 660.

In addition, as described above, the computing device can communicate with one or more networks, such as a local area network (LAN), a general wide area network (WAN) and/or a public network (e.g., the Internet) via network adaptor 680. As depicted, network adaptor 680 communicates with other components of the computing device via bus 615. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions tor implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for routing requests to a plurality of server clusters, comprising:
   a first server cluster comprising at least one server responding to requests concerning a first software via a first version of the first software and to requests concerning a second software via a first version of the second software;
   a second server cluster comprising at least one server responding to requests concerning the first software via a second version of the first software and to requests concerning the second software via a second version of the second software;
   a gateway router that initially routes requests concerning the first software by default to the first server cluster, unless an originator of a request has first predetermined credentials, in which case that request is routed to the second server cluster, and that initially routes requests concerning the second software by default to the first server cluster, unless an originator of a request has second predetermined credentials, in which case that request is routed to the second server cluster; and
   non-transitory memory comprising instructions that, when executed by one or more processors, cause the one or more processors to:
      receive a request to change default routing of requests concerning the first software to the second server cluster;
      update a configuration of the gateway router;
      in response to a subsequent request concerning the first software, route the request to the second server cluster unless an originator of a request has the first predetermined credentials; and
      in response to a subsequent request concerning the second software, route the request to the first server cluster unless an originator of a request has the second predetermined credentials.

2. The system of claim 1, comprising a third or more additional server clusters, each comprising at least one server responding to requests concerning the first software via a third or more additional version of the first software, respectively, and to requests concerning the second software via a third or more additional version of the second software, respectively, and wherein the gateway router initially routes requests concerning the first software to the third or more additional server cluster if an originator of that request has predetermined credentials different from the first predetermined credentials, and wherein the instructions, when executed by the one or more processors, cause the one or more processors to, in response to a subsequent request concerning the first software, route the request to the third or more additional server cluster even though the originator of that request does not have the predetermined credentials different from the first predetermined credentials.

3. The system of claim 1, wherein the request to change default routing of requests concerning the first software to the second server cluster is based at least in part on balancing load between the first and second server clusters.

4. The system of claim 1, wherein the request to change default routing of requests concerning the first software to the second server cluster is based at least in part on a software error detected on the first version of the first software.

5. The system of claim 1, wherein the request to change default routing of requests concerning the first software to the second server cluster is based at least in part on the second version of the first software being pushed into production.

6. The system of claim 1, wherein the request to change default routing of requests concerning the first software to the second server cluster is based at least in part on a prioritizing of software importance of the first software compared to the second software.

7. The system of claim 1, comprising multiple cells of server clusters, such that a first cell comprises the first and second server clusters, and a second cell comprises a third and fourth server cluster, such that:
   the third server cluster comprises at least one server responding to requests concerning a third software via a first version of the third software and to requests concerning a fourth software via a first version of the fourth software;

a fourth server cluster comprises at least one server responding to requests concerning the third software via a second version of the third software and to requests concerning the fourth software via a second version of the fourth software;

the gateway router initially routes requests concerning the third software by default to the third server cluster, unless an originator of a request has third predetermined credentials, in which case that request is routed to the fourth server cluster, and initially routes requests concerning the fourth software by default to the third server cluster, unless an originator of a request has fourth predetermined credentials, in which case that request is routed to the fourth server cluster; and the instructions, when executed by the one or more processors, cause the one or more processors to:

receive a request to change default routing of requests concerning the third software to the fourth server cluster;

update a configuration of the gateway router;

in response to a subsequent request concerning the third software, route the request to the fourth server cluster unless an originator of a request has the third predetermined credentials; and in response to a subsequent request concerning the fourth software, route the request to the third server cluster unless an originator of a request has the fourth predetermined credentials.

8. The system of claim 1, wherein the configuration of the gateway router is updated in response to a push request from a server configuration subsystem.

9. The system of claim 1, wherein the configuration of the gateway router is updated in response to a pull request to a failover database and receiving new configuration data from the failover database in response to the request.

10. The system of claim 1, wherein a graphical user interface is provided to receive the request to change default routing of requests concerning the first software to the second server cluster, and to update the configuration of the gateway router.

11. A computer-implemented method for routing requests to a of server clusters, comprising:

establishing a first server cluster plurality comprising at least one server responding to requests concerning a first software via a first version of the first software and to requests concerning a second software via a first version of the second software;

establishing a second server cluster comprising at least one server responding to requests concerning the first software via a second version of the first software and to requests concerning the second software via a second version of the second software;

programming a gateway router to initially route requests concerning the first software by default to the first server cluster, unless an originator of a request has first predetermined credentials, in which case that request is routed to the second server cluster, and that initially routes requests concerning the second software by default to the first server cluster, unless an originator of a request has second predetermined credentials, in which case that request is routed to the second server cluster;

receiving a request to change default routing of requests concerning the first software to the second server cluster;

updating a configuration of the gateway router;

in response to a subsequent request concerning the first software, routing the request to the second server cluster unless an originator of a request has the first predetermined credentials; and in response to a subsequent request concerning the second software, routing the request to the first server cluster unless an originator of a request has the second predetermined credentials.

12. The computer-implemented method of claim 11, wherein there are a third or more additional server clusters, each comprising at least one server responding to requests concerning the first software via a third or more additional version of the first software, respectively, and to requests concerning the second software via a third or more additional version of the second software, respectively, and wherein the gateway router initially routes requests concerning the first software to the third or more additional server cluster if an originator of that request has predetermined credentials different from the first predetermined credentials, and further comprising:

in response to a subsequent request concerning the first software, routing the request to the third or more additional server cluster even though the originator of that request does not have the predetermined credentials different from the first predetermined credentials.

13. The computer-implemented method of claim 11, wherein the request to change default routing of requests concerning the first software to the second server cluster is based at least in part on balancing load between the first and second server clusters.

14. The computer-implemented method of claim 11, wherein the request to change default routing of requests concerning the first software to the second server cluster is based at least in part on a software error detected on the first version of the first software.

15. The computer-implemented method of claim 11, wherein the request to change default routing of requests concerning the first software to the second server cluster is based at least in part on the second version of the first software being pushed into production.

16. The computer-implemented method of claim 11, wherein the request to change default routing of requests concerning the first software to the second server cluster is based at least in part on a prioritizing of software importance of the first software compared to the second software.

17. The computer-implemented method of claim 11, wherein there are multiple cells of server clusters, such that a first cell comprises the first and second server clusters, and a second cell comprises a third and fourth server cluster, and such that the third server cluster comprises at least one server responding to requests concerning a third software via a first version of the third software and to requests concerning a fourth software via a first version of the fourth software; a fourth server cluster comprises at least one server responding to requests concerning the third software via a second version of the third software and to requests concerning the fourth software via a second version of the fourth software; and the gateway router initially routes requests concerning the third software by default to the third server cluster, unless an originator of a request has third predetermined credentials, in which case that request is routed to the fourth server cluster, and initially routes requests concerning the fourth software by default to the third server cluster, unless an originator of a request has fourth predetermined credentials, in which case that request is routed to the fourth server cluster; and further comprising:

receiving a request to change default routing of requests concerning the third software to the fourth server cluster;

updating a configuration of the gateway router;

in response to a subsequent request concerning the third software, routing the request to the fourth server cluster unless an originator of a request has the third predetermined credentials; and in response to a subsequent request concerning the fourth software, routing the request to the third server cluster unless an originator of a request has the fourth predetermined credentials.

18. The computer-implemented method of claim 11, wherein the configuration of the gateway router is updated in response to a push request from a server configuration subsystem.

19. The computer-implemented method of claim 11, wherein the configuration of the gateway router is updated in response to a pull request to a failover database and receiving new configuration data from the failover database in response to the request.

20. The computer-implemented method of claim 11, wherein a graphical user interface is provided to receive the request to change default routing of requests concerning the first software to the second server cluster, and to update the configuration of the gateway router.

* * * * *